US012689542B2

(12) United States Patent
Schaefer et al.

(10) Patent No.: US 12,689,542 B2
(45) Date of Patent: Jul. 21, 2026

(54) GATEWAY DEVICE COMPRISING A HYDRAULIC PRESSURE RELEASE FUNCTION

(71) Applicant: VOLVO CONSTRUCTION EQUIPMENT AB, Eskilstuna (SE)

(72) Inventors: Thomas Schaefer, Trier (DE); Peter Bauer, Morbach (DE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 162 days.

(21) Appl. No.: 18/276,671

(22) PCT Filed: Feb. 11, 2021

(86) PCT No.: PCT/EP2021/053287
§ 371 (c)(1),
(2) Date: Aug. 10, 2023

(87) PCT Pub. No.: WO2022/171281
PCT Pub. Date: Aug. 18, 2022

(65) Prior Publication Data
US 2024/0106681 A1    Mar. 28, 2024

(51) Int. Cl.
*H04L 12/66* (2006.01)
*E02F 9/20* (2006.01)
(Continued)

(52) U.S. Cl.
CPC ............ *H04L 12/66* (2013.01); *E02F 9/2025* (2013.01); *E02F 9/205* (2013.01); *E02F 9/22* (2013.01);
(Continued)

(58) Field of Classification Search
CPC .... H04L 12/66; H04L 12/4625; E02F 9/2025; E02F 9/22; E02F 9/26; E02F 9/205;
(Continued)

(56) References Cited

U.S. PATENT DOCUMENTS

| | | | | |
|---|---|---|---|---|
| 2009/0158624 A1* | 6/2009 | Hartwick | ................ | E02F 9/205 |
| | | | | 29/825 |
| 2010/0145865 A1* | 6/2010 | Berger | ................... | G06Q 10/08 |
| | | | | 340/572.1 |

(Continued)

FOREIGN PATENT DOCUMENTS

| | | | | |
|---|---|---|---|---|
| EP | 2644780 A2 | 10/2012 | | |
| EP | 2589709 A2 * | 5/2013 | ............ | E02F 9/2012 |

(Continued)

OTHER PUBLICATIONS

JP-2001049699-A Kubota original and machine translation (Year: 2001).*

(Continued)

*Primary Examiner* — Kito R Robinson
*Assistant Examiner* — Zachary E. F. Glade
(74) *Attorney, Agent, or Firm* — Sage Patent Group

(57) ABSTRACT

A data communication gateway for a construction machine communication system, the gateway comprising including a first, a second, and a third data interface arranged to be mutually interconnected, where the mutual interconnect is controlled by a gateway electronic control unit, ECU,
    wherein the first interface is arranged to be connected to a private network of a construction machine, the second interface is arranged to be connected to an attachment network, and the third interface is arranged to be connected to an auxiliary network, (Continued)

wherein the gateway ECU is arranged to receive a request for hydraulic pressure release on the second interface and to forward the request as a hydraulic pressure release signal on the first interface.

19 Claims, 4 Drawing Sheets

(51) Int. Cl.

| | |
|---|---|
| *E02F 9/22* | (2006.01) |
| *E02F 9/26* | (2006.01) |
| *G05B 19/042* | (2006.01) |
| *G07C 3/02* | (2006.01) |
| *G07C 5/00* | (2006.01) |
| *H04L 12/46* | (2006.01) |

(52) U.S. Cl.
CPC .............. *E02F 9/26* (2013.01); *G05B 19/042* (2013.01); *G07C 3/02* (2013.01); *H04L 12/4625* (2013.01); *G07C 5/008* (2013.01)

(58) Field of Classification Search
CPC ......... E02F 3/3681; G07C 3/02; G07C 5/008; G05B 19/042
See application file for complete search history.

(56) References Cited

U.S. PATENT DOCUMENTS

| | | | |
|---|---|---|---|
| 2014/0223235 A1 | 8/2014 | Gundlapalli et al. | |
| 2014/0294622 A1 | 10/2014 | Fedde | |
| 2015/0198936 A1* | 7/2015 | McGee ................ | G05D 1/0038 |
| | | | 700/40 |
| 2015/0301518 A1 | 10/2015 | Takemoto et al. | |
| 2019/0234043 A1 | 8/2019 | Nygren et al. | |
| 2019/0323207 A1* | 10/2019 | Jones ................... | E02F 9/2235 |
| 2020/0181876 A1* | 6/2020 | Mahrenholz ............. | E02F 3/43 |

FOREIGN PATENT DOCUMENTS

| | | | | |
|---|---|---|---|---|
| GB | 2319357 A | | 5/1998 | |
| JP | 2001049699 A | * | 2/2001 | ............. E02F 9/226 |
| WO | 2022171281 A1 | | 8/2022 | |

OTHER PUBLICATIONS

International Search Report and Written Opinion of the International Searching Authority, PCT/EP2021/053287 mailed Nov. 10, 2021, 14 pages.

* cited by examiner

GATEWAY DEVICE COMPRISING A HYDRAULIC PRESSURE RELEASE FUNCTION

CROSS REFERENCE TO RELATED APPLICATIONS

This application is a 35 U.S.C. § 371 national stage application of PCT International Application No. PCT/EP2021/053287 filed on Feb. 11, 2021, the disclosure and content of which is incorporated by reference herein in its entirety.

TECHNICAL FIELD

The present disclosure relates to construction equipment such as excavators, wheel loaders, and haulers. There are disclosed communication systems, electronic control units (ECU), machines and tool attachments which facilitate exchange of information between, e.g., a construction machine and an attached tool. Although the invention will be described mainly with respect to an excavator, the invention is not restricted to this particular type of vehicle but may also be used in other types of vehicles such as forestry machines, mining vehicles, haulers, and the like.

BACKGROUND

Heavy duty construction machines, such as excavators and the like, comprise a main body with a power source, i.e., a combustion engine and/or electrical machine, and one or more tool carriers extending out from the main body and arranged to carry respective tools, or attachments.

Traditionally, the complexity of the construction machine has been centered around the main body and tool carrier. However, attachments are becoming ever more intelligent and capable. For instance, so-called tiltrotators have recently gained popularity. A tiltrotator is a hydraulic attachment mounted on the tool carrier of, e.g., an excavator which permits a tool be rotated 360 degrees and also tilted in response to control input from an operator, thus increasing the flexibility and precision of the tools attached to the tiltrotator.

There is a desire to feed information back to the construction machine about, e.g., the current pose of the tiltrotator in order to facilitate a more accurate and/or efficient control of the tiltrotator. Thus, more recent tiltrotators comprise sensors and ECUs which allow communication between a controller on the attachment and an ECU on the construction machine. Other attachments comprising ECUs and sensors are also being introduced to the market. Generally, such attachments may communicate with an ECU on-board the construction machine in order to, e.g., receive commands from the construction equipment and also report status information back to the host machine.

US 2019/0354098 A1 discusses gateway interfaces for work machines which provide reliable communication between a remote control device and a data network of a construction machine. Nevertheless, there is a continuing need for even more flexible and reliable construction machine communication systems which allows exchange of data between construction machine and peripheral devices.

SUMMARY

It is an object of the present disclosure to provide communication systems comprising gateways which enable efficient, robust, secure and/or cost effective communication between a construction machine such as an excavator and an attachment. Communication with one or more auxiliary devices, such as an operator support display system, is also provided for herein.

The object is obtained by a data communication gateway for a construction machine communication system. The gateway comprises a first, a second, and a third data interface arranged to be mutually interconnected, where the mutual interconnect is controlled by a gateway electronic control unit (ECU). The first interface is arranged to be connected to a private network of a construction machine, the second interface is arranged to be connected to an attachment network, and the third interface is arranged to be connected to an auxiliary network. The gateway ECU is arranged to receive a request for hydraulic pressure release on the second interface and to forward the request as a hydraulic pressure release signal on the first interface.

This means that the attachment can request a pressure release actuated by the main hydraulic system of the construction machine in a convenient and reliable manner. Thus, there is no longer a need for complicated pressure reduction valves and the like in the attachment.

According to aspects, the gateway ECU is arranged to receive an acknowledgement signal on the first interface in response to the hydraulic pressure release signal, and to forward the acknowledgement signal on the second interface. This acknowledgement signal increases system robustness, since the attachment now known that the request has been properly received.

According to aspects, the gateway ECU is arranged to be connected to a hydraulic pressure sensor. The gateway ECU can then be arranged to transmit an acknowledgement signal indicating hydraulic pressure release on the second interface in response to detecting a pressure drop by the hydraulic pressure sensor. This feature further improves system reliability and robustness, since the gateway itself receives information about the pressure release independently from the construction machine communication.

According to aspects, the gateway ECU is arranged to receive a request for a specified hydraulic pressure on the second interface and to forward the request as a hydraulic pressure request signal on the first interface. This allows the attachment to control hydraulic pressure. For instance, pressure can be controlled in dependence of use case, operating scenario, or other configuration. This improves overall performance of the system.

According to aspects, the gateway ECU is arranged to receive a request for a specified hydraulic flow on the second interface and to forward the request as a hydraulic flow request signal on the first interface. This allows the attachment to control hydraulic flow. For instance, hydraulic flow can be controlled in dependence of use case, operating scenario, or other configuration. In a manner similar to the above-mentioned pressure control by the attachment, this improves overall performance of the system.

According to aspects, the gateway ECU is arranged to perform an authentication procedure in response to a device connecting to one of the interfaces. Thus, advantageously, only trusted devices may be allowed to connect to the gateway. This increases overall system security and also resilience against malicious attacks from third party devices. The gateway ECU is optionally arranged to select a message forwarding policy to be the configured message forwarding policy in dependence of an outcome of the authentication procedure. The gateway ECU is optionally arranged to forward the hydraulic pressure release signal on the first interface only in case the authentication procedure has been successfully completed. Thus, control of the construction machine hydraulic system is only allowed by trusted devices.

According to aspects, the gateway ECU is arranged to forward a request for adjustment of hydraulic system pressure or flow received on the second interface on the first interface as a command to a control unit arranged to control a hydraulic pump comprised in the construction machine. This way an attachment is allowed to control the hydraulic system directly, which means that more refined hydraulic system control can be performed, which is an advantage. Of course, the gateway ECU may also be arranged to forward the request for adjustment of hydraulic system pressure or flow only in case the authentication procedure has been successfully completed, in order to maintain a high level of control integrity.

According to aspects, the gateway ECU is arranged to identify an attachment type of an attachment connected to the second interface. The gateway ECU may then be arranged to configure one or more hydraulic system parameters of the construction machine in dependence of the identified attachment type. This way the hydraulic system can be customized for a given attachment, which means that the overall system performance may be improved.

According to aspects, at least one of the first, second, and third interfaces is a controller area network (CAN) bus interface. It is an advantage that the proposed techniques are compatible with CAN bus systems, since this communication system is commonly used with heavy duty construction machines. This allows the system to be backwards compatible with legacy systems.

According to aspects, at least one of the first, second, and third interfaces supports a communication standard different from a CAN bus standard. This means that the gateway can also act as an adapter between different message format networks, which is an advantage. For instance, a message translation policy comprising one or more message translation rules is optionally configured in the gateway ECU. The gateway ECU can then be arranged to translate messages forwarded onto the interfaces in dependence of the message translation policy.

There is also disclosed herein control units, computer programs, computer readable media, computer program products, and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings:

4

Figures 1, 2:
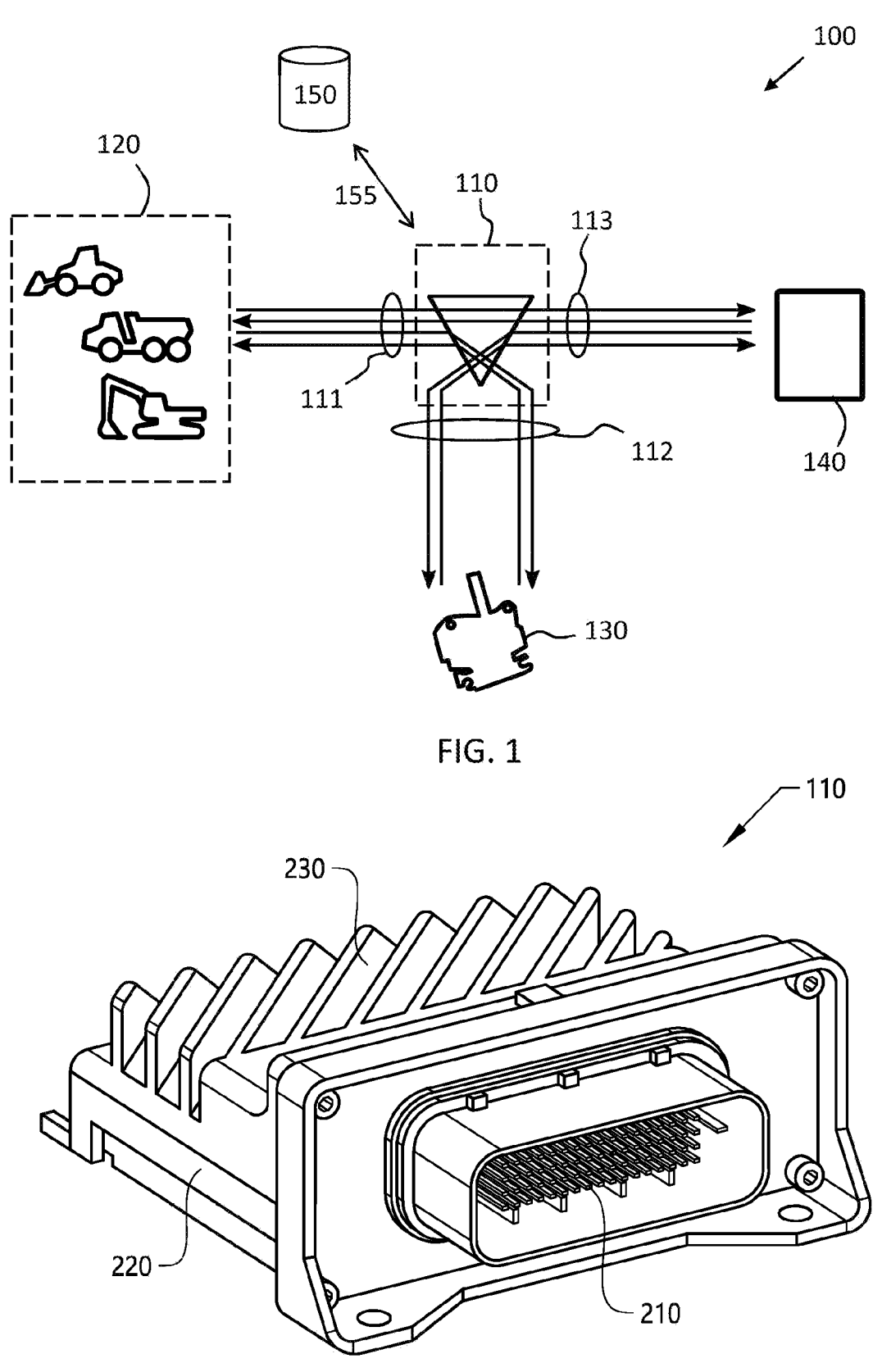
Figure 3:
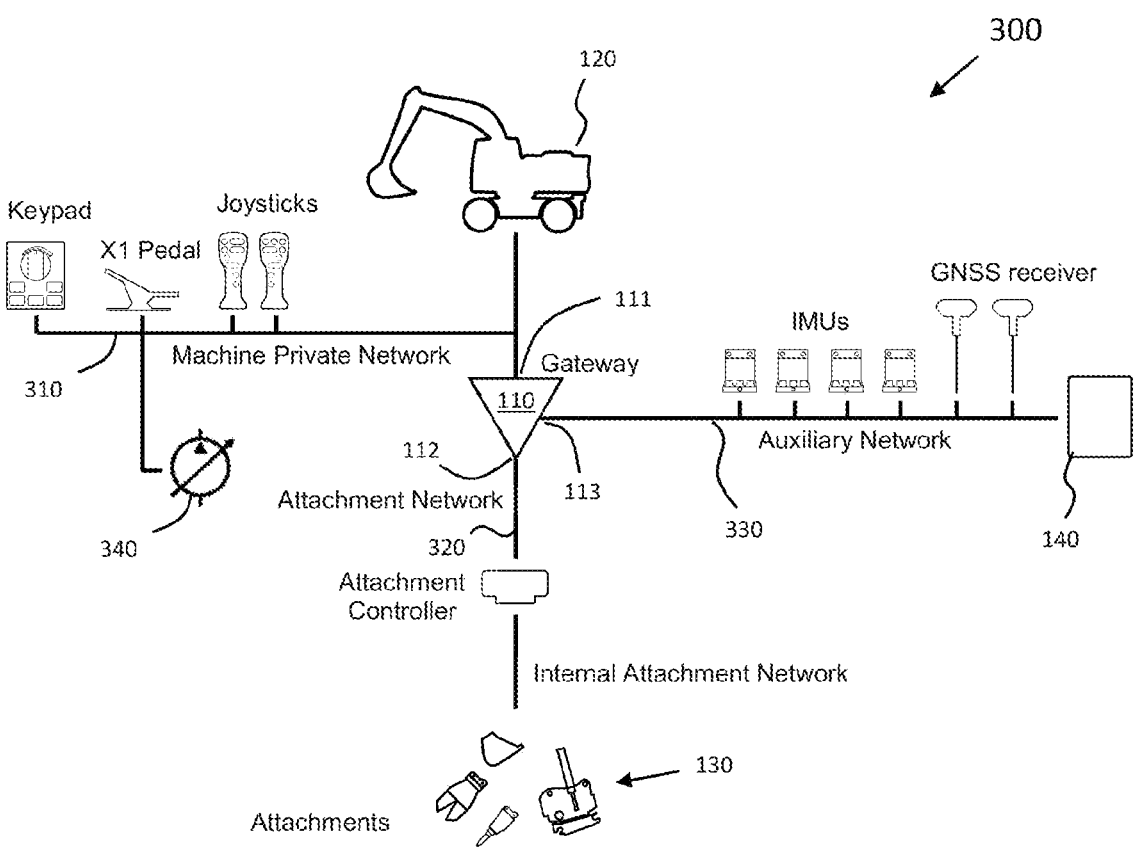
Figure 4:
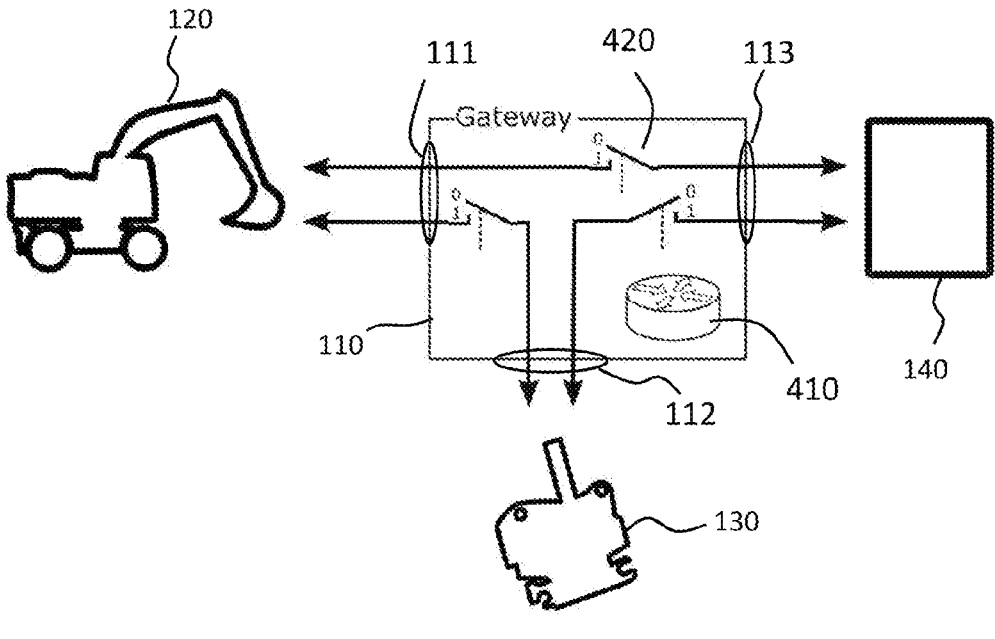
Figure 5:
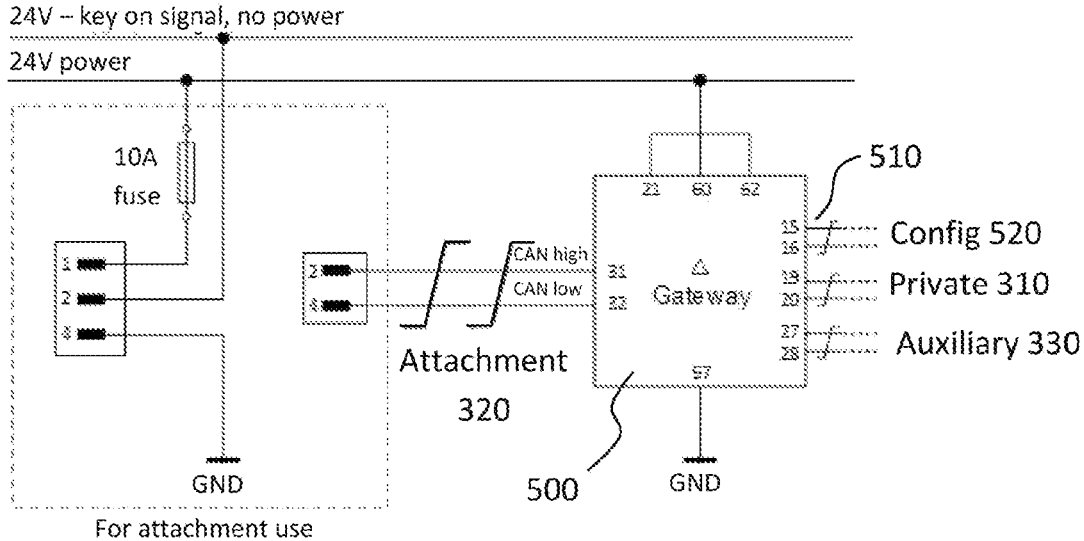
Figure 6:
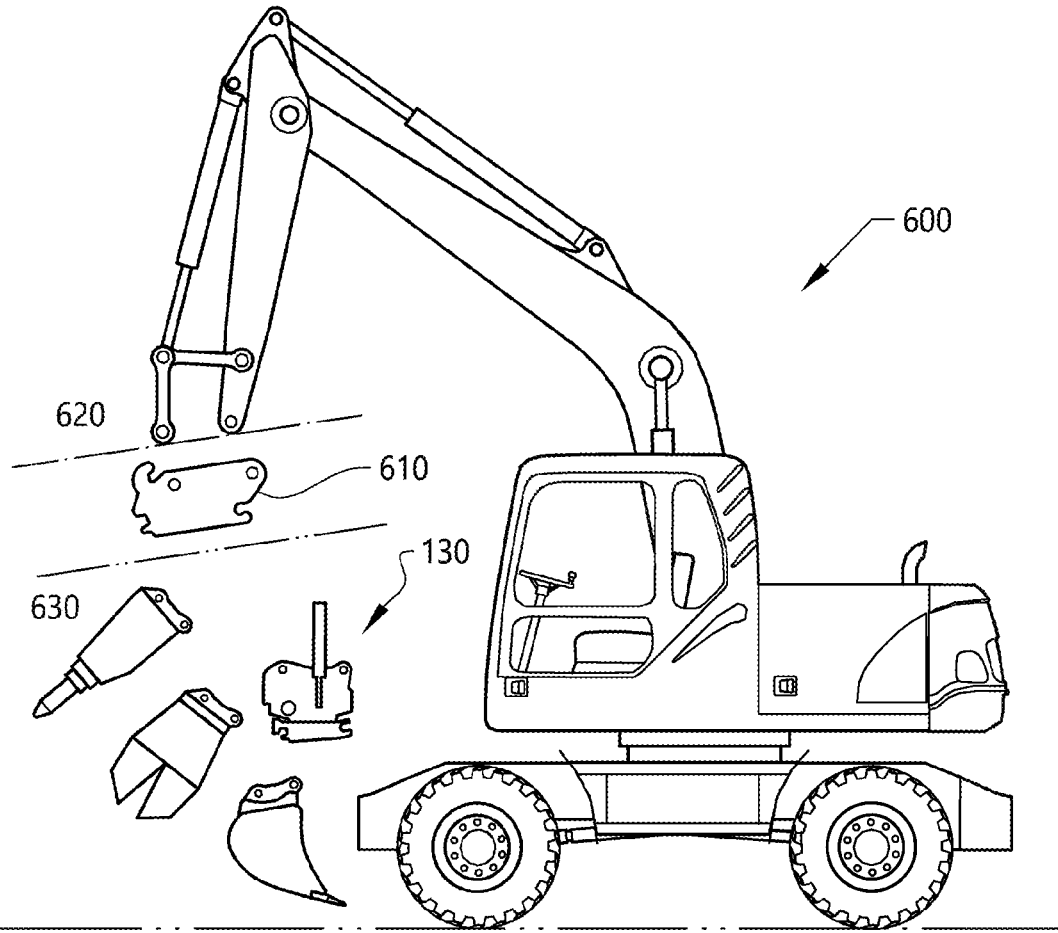
Figures 7A, 7B, 7C:
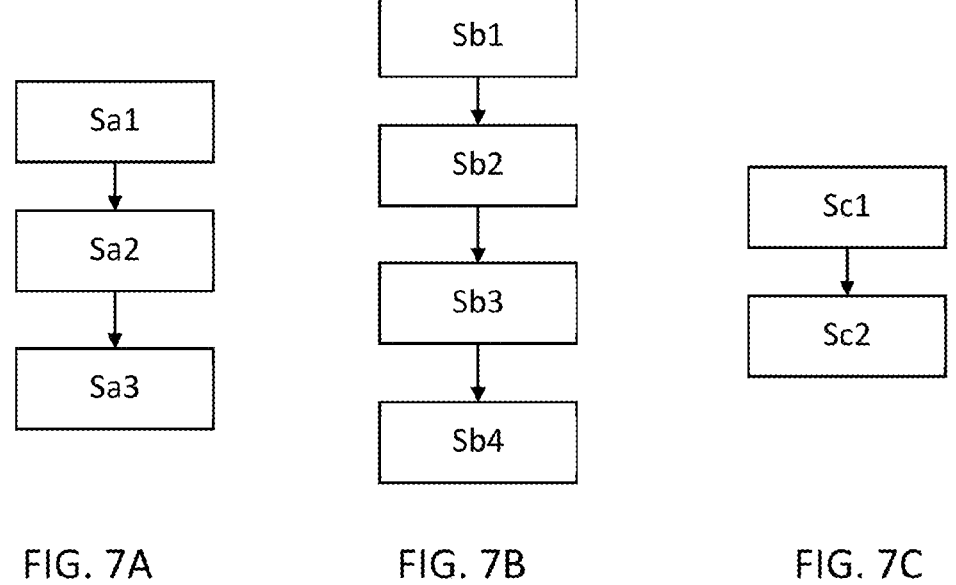
Figures 8, 9:
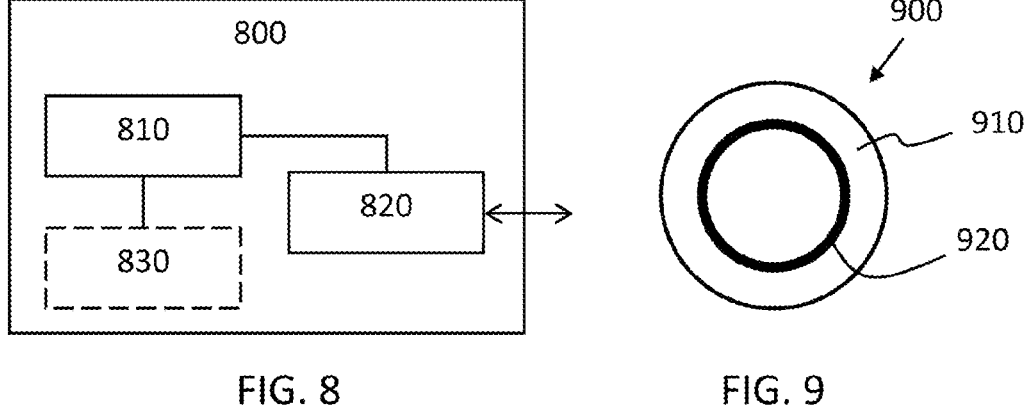

FIG. 1 schematically illustrates a system for machine communication;

FIG. 2 shows a physical interface suitable for a gateway device;

FIG. 3 illustrates details of an example machine communication system;

FIG. 4 shows a gateway able to isolate interfaces from each other;

FIG. 5 schematically illustrates a machine with an intermediate attachment device;

FIG. 6 illustrates details of a gateway electronic control unit;

FIGS. 7A-C are flow charts illustrating methods;

FIG. 8 schematically illustrates a control unit; and

FIG. 9 shows an example computer program product.

DETAILED DESCRIPTION OF EXAMPLE
EMBODIMENTS OF THE INVENTION

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 schematically illustrates a construction machine communication system 100. The system 100 comprises a construction machine 120, which may be, e.g., an excavator, a hauler, or the like, but could as mentioned above also be a forestry vehicle or a mining vehicle. The construction machine 120 implements a private network which interfaces via a first interface 111 to a gateway 110. The private network of the construction machine 120 is often based on one of the controller area network (CAN) bus standards, and supports data exchange between various entities on the construction machine 120, such as operator joysticks, propulsion tracks or driven wheels, steering arrangements, various tool carriers, etc. The private network of the construction machine normally controls one or more hydraulic systems, comprising hydraulic pumps and control valves for regulating hydraulic flow and pressure, e.g., in response to operator input commands.

The gateway 110 also comprises a second interface 112 arranged to be connected to an attachment 130. An attachment is a form of tool, such as the tiltrotator discussed above. As mentioned above, many attachments available on the market today comprise ECUs configured to control one or more functions implemented by the attachment, and/or to obtain sensor data from sensors arranged in connection to the attachment. This attachment ECU, which may also be referred to as an attachment controller, is connected to the different actuators and sensors of the attachment via an attachment network which is separate from the private network of the construction machine. The attachment network may be connected to the gateway via a second interface 112 of the gateway 110. Thus, the gateway 110 is in a position to control a connection between the private network of the machine 120, and the attachment network.

The gateway illustrated in FIG. 1 also comprises a third interface 113. This interface allows for connection of an auxiliary device 140 to the communication system 100. This auxiliary device may, e.g., be a display which indicates a status and potentially also a pose of an attached tool, i.e., an attachment 130, in real time. If the auxiliary device 140 is mounted in a control cabin of the construction machine 120, then the operator can be assisted in performing a work task by various forms of data displayed on the auxiliary device 140. The auxiliary device 140 may also be configured to receive input commands from an operator, or from some other control system, and transmit these control commands as messages to the gateway 110. An example auxiliary device is the Dig Assist system manufactured and sold by AB Volvo.

The gateway 110 comprises a gateway ECU arranged to manage connections between the first 111, second 112, and third 113 interfaces. In other words, the gateway ECU controls interconnections between the private network of the construction machine, the attachment network, and the auxiliary network. The various features and functions of this gateway ECU will be discussed in more detail below. A schematic description of the components of this gateway ECU will be given below in connection to FIG. 8.

A remote device 150, such as a remote server or some cloud-based processing or storage resource may optionally be accessible from the gateway 110. For instance, the gateway ECU may be arranged to connect to the remote device 150 via wireless link in order to download configuration data and also upload messages and status information for further processing by the remote device 150. The remote device may also control access policies and message forwarding rules implemented by the gateway ECU, as will be discussed in more detail below.

Construction machine communication systems, like the system 100, are expected to operate in harsh conditions and are normally associated with strict requirements on reliability and robustness.

FIG. 2 shows an example of a physical realization of the gateway 110. This example comprises a robust multi-pin connector 210 for outdoor use in harsh conditions, which implements at least the second interface 112 towards the attachment. The gateway 110 in FIG. 2 comprises a sealed casing 220 which encloses and protects the gateway ECU from the ambient environment. Cooling flanges 230 are arranged on the sealed casing 220 to dissipate heat generated by, e.g., the gateway ECU. The physical realization of the gateway may also be mounted in the cabin of the host machine, where it will be protected from the outside environment. This has the additional advantage of reducing the requirements on weather protection and the like.

FIG. 3 shows an example machine communication system 300, where the private network 310 belongs to an excavator machine. This private network connects a plurality of control devices on the excavator, such as a keypad, a pedal, and joysticks, to the gateway via the first interface 111. This private network also connects to a hydraulic system of the excavator, comprising a pump 340 and often also one or more hydraulic control valves (not shown in FIG. 3).

The second interface 112 of the gateway is connected to an attachment 130 via an attachment network 320. This attachment network may comprise an attachment controller as indicated in FIG. 3, but this is not strictly necessary. One or more sensors arranged in connection to the attachment may also be attached to the attachment network, and therefore reachable via the gateway 110.

The example auxiliary network 330 illustrated in FIG. 3 comprises a plurality of inertial measurement units (IMU), one or more Global Navigation Satellite System (GNSS) receivers, and an auxiliary device 140. The auxiliary device 140 may, e.g., be a display coupled to processing means arranged to support an operator in performing some work task. As such, the auxiliary device may be arranged to receive data from the sensors on the attachment via the gateway, and possibly also control one or more functions of the attachment via command messages transmitted to the attachment network via the gateway. A control message issued on the private network may control a hydraulic pressure and/or a hydraulic flow in the hydraulic system of the construction machine 120. If the gateway forwards such hydraulic system control messages from the auxiliary network 330 and/or from the attachment network 320, then remote control of the hydraulic system is enabled. It is appreciated that, since the gateway ECU controls the interconnect between the first 111, second 112, and third 113 interfaces, the gateway ECU is in a position to control which messages that are allowed to pass from one network to another network, as illustrated in FIG. 4 by the switches 420. For instance, some types of messages may not be deemed safe to pass onto the private network of the construction machine 120, since such messages may cause undesired events, or simply overload the private network, causing undesired congestion which may hamper operations. An auxiliary device 140 may not be trusted to generate control commands for controlling an attachment. In this case, it may still be allowed to receive sensor data from the attachment network, which enables it to, e.g., visualize a pose and display tool status in a passive manner.

With reference to FIG. 4, the gateway ECU may also implement a routing function 410 which forwards messages received on one interface to another interface in dependence of, e.g., a message type, an identifier value, or some other data filed within the message. This reduces the load on the other networks, which is an advantage. This routing function may of course also be used to prevent messages of a certain type or messages generated by a given device to enter sensitive areas of, e.g., the private network of the construction machine.

FIG. 5 illustrates an example of how the gateway ECU 500 may be connected to the machine private network 310, the attachment network 320, and to the auxiliary network 330. The gateway ECU may operate at a nominal voltage of 24 V.

FIG. 5 also illustrates a fourth interface 510. This fourth interface is a configuration interface arranged to be connected to a configuration network 520. A configuration tool may be connected to this configuration network in order to configure one or more parameters of the gateway ECU, such as different routing and forwarding policies, message format translation mechanisms, and authentication data. This fourth interface 510 may be arranged as a wired interface for connecting to a service and configuration tool, or it may be connected to a wireless device arranged to establish a wireless communication link to a service and configuration tool. The fourth interface may be associated with an authentication procedure, which means that a device attempting to connect to the gateway ECU via the fourth interface 510 is first subjected to an authentication procedure, involving, e.g., a challenge response mechanism or an identification and password procedure. This authentication procedure may be supported by the remote device 150 shown in FIG. 1.

To summarize, the above discussions have evolved around a data communication gateway 110 for a construction machine communication system as exemplified in FIGS. 1 and 3. The gateway 110 comprises a first 111, a second 112, and a third 113 data interface arranged to be mutually interconnected, where the mutual interconnect is controlled by a gateway ECU, such as the gateway ECU 500 shown in FIG. 5.

The first interface 111 is, as shown in FIGS. 1 and 3, arranged to be connected to a private network 310 of a construction machine 120. This network may comprise one or more sensitive devices, or sensitive data, and it may be desired to shield this private network from influence by, e.g., third party attachments comprising ECUs which may otherwise cause undesired actions by the construction machine. The second interface 112 is arranged to be connected to an attachment network 320, and the third interface 113 is arranged to be connected to an auxiliary network 330. It is foreseen that the diversity of attachments comprising ECUs connected to sensors and actuators, as well as the number of different auxiliary devices, will increase over the coming years. Also, third party suppliers are likely to offer auxiliary equipment providing various functions such as operator support in visualizing a current pose and status of an attachment. Such auxiliary equipment is advantageously connected to the attachment ECU and also to the private network of the construction machine. This interconnect between different networks, sometimes from different vendors, is preferably controlled such as to avoid undesired exchange of data messages over the gateway. Towards this end, the gateway ECU implements a message forwarding policy comprising one or more message forwarding rules. The gateway ECU is also arranged to route messages onto the first, second and third data interfaces in accordance with the message forwarding policy. The message forwarding policy may be in the form of a look-up table stored in an erasable programmable read-only memory device (EPROM) of the gateway ECU, or it can be stored in some other form of memory device. Parameters in the EPROM of the gateway ECU can be set or deleted using, e.g., a configuration and maintenance tool. The EPROM parameters can be used by the gateway ECU software to enable or disable the communication between external ECUs connected to the gateway 110. Not only the complete communication between the ECUs can be enabled/disabled, it is also possible to control single messages and even single signals within a message by the gateway ECU.

At least one of the first, second, and third interfaces can be a controller area network (CAN) bus interface. CAN bus interfaces are the dominant standard for machine communication involving construction equipment today. However, it is noted that the techniques and devices disclosed herein are in no way limited to operation based on a CAN bus standard. Rather, the techniques disclosed herein are applicable with a wide range of wired and wireless communication standards. For instance, at least one of the first, second, and third interfaces may support a communication standard different from a CAN bus standard, such as Ethernet, Wi-Fi, industrial Bluetooth, one of the IEEE 802.11 standards, and the like.

To support different communication standards on the different connected networks in the same communication system 100, 300, the gateway ECU may implement a message translation policy comprising one or more message translation rules. The gateway ECU is then arranged to translate messages forwarded onto the interfaces in dependence of the message translation policy. Thus, the gateway ECU may interface with an Ethernet port on the second interface towards some attachment having Ethernet as its communication standard. Commands from the construction machine 120 to the attachment 130, and/or from the auxiliary device 140 to the attachment is then translated from, e.g., CAN bus messages into Ethernet packets and forwarded to the attachment. In a similar manner, Ethernet packets comprising, e.g., sensor data and status signals received over the Ethernet port from the attachment can be translated into message formats compatible with a CAN bus standard, and sent onwards onto a CAN bus private network of the construction machine, and/or a CAN bus network of an auxiliary device 140. The message translation rules are akin to a software driver for a given attachment, which driver can be pre-configured in the gateway ECU, or downloaded as needed from a remote server, like the remote device 150 illustrated in FIG. 1. A vendor may thus provide an attachment along with a respective software driver for enabling connection between the attachment and, e.g., a standard CAN-bus interface of a construction machine.

A discussed above in connection to FIG. 4, the message forwarding rules may also comprise a list of message identifiers and corresponding interfaces on which a message having a given identifier is to be forwarded. Thus, the gateway ECU implements a routing function, where messages intended for a given network is forwarded onto that particular network and not onto other networks. This function is associated with two main advantages. First, the function allows a network like the private network to be shielded from potentially harmful messages generated by third party devices. Thus, a level of access control, or message policing, is implemented by the gateway ECU. Second, this routing function reduces the load on the overall system, since messages are only forwarded onto networks where they are relevant. A message may of course be forwarded from a source interface into more than one destination interface, but some messages may, e.g., to intended for a specific recipient, and can therefore be forwarded onto a single destination interface. The gateway ECU may for instance, be arranged to obtain the message forwarding policy from the remote server 150. Thus, message forwarding policies can be configured centrally for, e.g., a fleet of vehicles. Message forwarding policies can also be configured in dependence of which work site the construction machine is on, or based on some other parameter.

One example of this type of forwarding is a stream of third party sensor data and commands between an attachment and an auxiliary display and control unit provided by that same third party. By implementing a set of forwarding rules which allow such messages to pass between attachment and auxiliary device, but not onto the private network 310 of the construction machine, the attachment and auxiliary device may not need to be subjected to as rigorous verification and testing as would have been required if there was a possibility for the third party devices to interact with the more sensitive systems on the construction machine 120.

According to aspects, the message forwarding rules may also comprise a list of message identifiers indicating messages to be dropped by the data communication gateway 110. Thus, the gateway ECU may also implement a function similar to a message or packet filtering function, which has the associated advantage of reducing communication load on the different networks, and increasing system robustness and stability in general. The gateway ECU may, e.g., be configured to drop packets which are known to generate fault conditions in the system. Thus, a bug or system flaw can be corrected by the gateway ECU without action from a third party responsible for generating the bug or system flaw. Conversely, the message forwarding rules may also comprise a list of message identifiers indicating allowed signals to be forwarded on an interface. Messages other than the explicitly permitted messages can then be dropped, resulting in a more restrictive access to the different networks.

A message identifier may be a header of a message having a data packet format with header and message payload. A message identifier may also be a hash value computed for the whole message or for sections of a message.

The gateway ECU may also monitor messages forwarded via the gateway interfaces in order to collect statistics and other forms of data, which can then be accessed by, e.g., a technician. This data collection function of the gateway can be implemented transparently to the different communicating entities, such that the communication is not affected by the data collection, which is an advantage.

The gateway ECU may furthermore be arranged to perform an authentication procedure in response to a device connecting to one of the interfaces 111, 112, 113. For instance, an attachment controller 350 (shown in FIG. 3) attaching to the gateway may be requested to authenticate itself to the gateway ECU. This authentication procedure may be implemented in a number of different ways. For instance, the attachment controller may supply a unique identifier to the gateway ECU, which unique identifier can then be matched to a list of allowed identifiers maintained by the gateway ECU. The gateway ECU may also contact the remote device 150 in order to verify if the attachment controller is allowed to interface with one or more of the networks. Perhaps the attachment controller is allowed access to the auxiliary network 330, but not to the private network 310. This authentication procedure is associated with the advantage that attachments and other devices which have not received prior authorization for access to the gateway can be prevented from accessing the gateway.

The authentication procedure may involve a challenge response method, where a challenge is issued from the gateway ECU. If the attachment controller does not respond correctly to the challenge, then the attachment ECU may be prevented from interfacing with the other networks, or may just be allowed to access restricted sections of the other networks. In other words, the gateway ECU is optionally arranged to select a message forwarding policy to be the configured message forwarding policy in dependence of an outcome of the authentication procedure.

According to some aspects, the gateway ECU is arranged to obtain a list of devices and associated device identifiers to be allowed access to the gateway from the remote server 150. This list of devices may, e.g., correspond to a list of devices which have been verified as compliant with some standard or set of rules, and/or a list of devices associated with some form of subscription or license to access the gateway functions.

The gateways and gateway ECUs discussed herein may also advantageously be used for translating between different communication standards, i.e., as a bridge between devices communicating according to one format and devices communicating according to another format. Towards this end, there is disclosed a data communication gateway 110 for a construction machine communication system 100, 300. The gateway 110 comprises a first 111, a second 112, and a third 113 data interface arranged to be mutually interconnected, where the mutual interconnect is controlled by a gateway ECU. The gateway ECU may be the same gateway ECU as discussed above, or another independent ECU. It is appreciated that the functions of format translation discussed below can be implemented independently or in combination with the various features discussed herein. As illustrated in, e.g., FIG. 1 and FIG. 3, the first interface 111 is arranged to be connected to a private network 310 of a construction machine 120, the second interface 112 is arranged to be connected to an attachment network 320, and the third interface 113 is arranged to be connected to an auxiliary network 330. A message format table comprising one or more message formats is configured in the gateway ECU. A message format is indicative of a message formatting relative to a standard message format of the construction machine communication system 100, 300. For instance, an attachment may comprise a sensor device arranged to generate data with a given sign convention, say a coordinate which is positive in an upwards direction from ground, and negative in a downwards direction. Another attachment sensor may generate its output as an unsigned integer value, or with the opposite polarity. This may cause problems if the data from the sensors is to be displayed on an auxiliary device 140 such as a display in the operator cabin. If the auxiliary device interprets the sensor data in the wrong way, since it assumes that the sensor data is formatted differently, then an undesired situation results, and the output on the display is likely to be rather confusing. The alleviate such problems, the gateway ECU is arranged to receive a message on a source interface out of the first 111, second 112, and third 113 interfaces, translate a data content of the message based on the message format table, and forward a message comprising the translated data content onto a destination interface out of the first 111, second 112, and third 113 interfaces. Thus, a message format may be converted into the desired message format and sent on to the data consumer, which will receive data formatted according to the assumptions. For example, the different sensor signals discussed above can be converted into a common format, which common format can then be correctly interpreted by the auxiliary device to display the data in the correct manner.

According to some aspects, a baudrate of the source interface is different from a baudrate of the destination interface. The gateway ECU may then adjust a baudrate of a message received on the source interface to match the baudrate on the destination interface. For instance, suppose an attachment controller is arranged to communicate at a first baudrate over a CAN bus network, but the private network of the construction machine is set up at a different baudrate. This would normally imply incompatibility between construction machine and attachment. However, since the gateway ECU is able to translate from one baudrate into another baudrate, it can act as a bridge between the two incompatible communication busses, and thus allow use of the attachment. A device connecting to an interface of the gateway 110 may execute a handshake procedure in order to establish a suitable baudrate prior to starting exchanging messages with the other networks connected to the gateway.

According to another example, a sequence of messages received on the source interface may be associated with a data sample rate which is different compared to a desired sample rate of the destination interface. The gateway ECU is arranged to resample data in the received sequence of messages to match the expected sample rate of the destination interface. For instance, suppose that some auxiliary device 140 computes a velocity based on position information received from a sensor mounted on an attachment. If the auxiliary device expects position data at, say 10 Hz, but receives position data at 20 Hz, then the computed velocity will differ from the true velocity by a factor of two, which may lead to catastrophic results. The gateway ECU can, however, easily resample the data to avoid such errors.

The gateway ECU may be arranged to receive an identification signal from an attachment 130 connected to the second interface 112, and to configure the message format table in dependence of the received identification signal. For instance, an attachment may identify itself upon connection to the gateway, and provide details regarding its delivered data, and the command format it expects from the gateway in order to perform the intended function. This specification may be just an identifier to identify a format out of a pre-configured list of standardized formats, or it can be a more detailed list of translation rules, which can be executed by the gateway ECU in order to translate from some reference standard into the format of the attachment. Advantageously, even proprietary message formats may be handled in this manner, thus allowing use of otherwise incompatible equipment from different manufacturers. The data communication gateway 110 may be arranged to store a plurality of message format tables, and to select a message format table to be the configured message format table in dependence of the identification signal. Thus, the gateway stores a set of software routines or set of rules akin to software drivers. A given attachment is then associated with a corresponding driver. As long as the correct driver is available to the gateway ECU, it will be able to translate between signals generated in the reference system of the construction machine 120 and signals generated in the reference system of the attachment. A set of drivers, or a message format table, associated with the identification signal may of course also be obtained from the remote server 150.

The data communication gateway 110 is optionally arranged to configure a default message format table associated with reduced functionality in case a message format table associated with the identification signal is not available to the gateway ECU. Thus, even if the correct "driver" cannot be located for interfacing with a given attachment or auxiliary device, a default driver may permit use of the attachment or auxiliary device, albeit at reduced functionality.

FIG. 6 illustrates a construction machine 600 which is arranged to interface with different attachments 130 via an intermediary attachment device 610. The hydraulic system on the construction machine is used to power the attachment via the intermediary attachment device 610. To release the attachment 130 from the intermediary attachment device, the pressure in the hydraulic feed must first be released, otherwise there is a risk of damaging gaskets and other hydraulic components. To reduce the pressure at the interface 630, it is possible to implement advanced pressure reducing valves in the intermediary attachment 610. However, such valves are relatively complex and may drive overall cost of the system. A better solution would be to transmit a request to the hydraulic system in the construction machine via the private network 310 to reduce pressure by controlling, e.g., the pump 340. However, there is normally no communication path from the attachment 130 to the private network 310 of the construction machine 120.

To simplify operations involving attachment assembly, there is disclosed herein a data communication gateway 110 for a construction machine communication system 100, 300 like those illustrated in FIGS. 1 and 3. The gateway 110 comprises a first 111, a second 112, and a third 113 data interface arranged to be mutually interconnected, where the mutual interconnect is controlled by a gateway ECU. The first interface 111 is arranged to be connected to a private network 310 of a construction machine 120, the second interface 112 is arranged to be connected to an attachment network 320, and the third interface 113 is arranged to be connected to an auxiliary network 330. The gateway ECU is arranged to receive a request for hydraulic pressure release on the second interface 112 and to forward the request as a hydraulic pressure release signal on the first interface 111. Thus, the request may be transmitted from the attachment onto the private network of the construction machine 120, which may then control the hydraulic feed pressure in response to the request in order to facilitate attachment assembly.

The gateway ECU is optionally arranged to receive an acknowledgement signal on the first interface 111 in response to the hydraulic pressure release signal, and to forward the acknowledgement signal on the second interface 112. This way an attachment controller may determine when pressure has been released, so that it is safe to disengage from the hydraulic system of the intermediary attachment device 610.

The gateway ECU is optionally also arranged to be connected to a hydraulic pressure sensor. The gateway ECU can then be arranged to transmit an acknowledgement signal indicating hydraulic pressure release on the second interface 112 in response to detecting a pressure drop by the hydraulic pressure sensor.

Of course, more advanced control of the hydraulic system of the construction machine 120 can be realized based on the gateway ECUs disclosed herein. For instance, the gateway ECU can optionally be arranged to receive a request for a specified hydraulic pressure on the second interface 112 and to forward the request as a hydraulic pressure request signal on the first interface 111. The gateway ECU can also be arranged to receive a request for a specified hydraulic flow on the second interface 112 and to forward the request as a hydraulic flow request signal on the first interface 111. This way a sort of remote control of the hydraulic system on the construction machine 120 can be realized. Of course, connecting back to the discussions above related to message policing and filtering, the gateway ECU may implement a range of allowable control parameters, and thus limit the range of controls allowed from the attachment. This way a margin can be maintained towards critical pressure levels and maximum flow levels in order to ensure that the system is not inadvertently placed under unnecessary stress by the attachment controller. The gateway ECU can furthermore be arranged to forward a request for adjustment of hydraulic system pressure or flow received on the second interface 112 on the first interface 111 as a command to a control unit arranged to control a hydraulic pump comprised in the construction machine 120.

As discussed above, the gateway ECU can optionally be arranged to perform an authentication procedure in response to a device connecting to one of the interfaces 111, 112, 113. In this case the gateway ECU may forward the hydraulic pressure release signal on the first interface 111 only in case the authentication procedure has been successfully completed.

The gateway ECU can also be arranged to identify an attachment type of an attachment connected to the second interface 112. The gateway ECU may then configure one or more hydraulic system parameters of the construction machine 120 in dependence of the identified attachment type. The parameters may, e.g., comprise a hydraulic pressure and/or hydraulic flow.

FIGS. 7A-C show flow charts which illustrate methods that summarize the discussions herein. It is appreciated that use of all of the optional details of the devices discussed herein, as well as the optional techniques, may be cast as optional steps in the disclosed methods.

FIG. 7A illustrates method performed by a data communication gateway 110 comprised in a construction machine communication system 100, 300, the gateway 110 comprising a first 111, a second 112, and a third 113 data interface arranged to be mutually interconnected, where the mutual interconnect is controlled by a gateway ECU. The method comprises connecting Sa1 the first interface 111 to a private network 310 of the construction machine 120, the second interface 112 to an attachment network 320, and the third interface 113 to an auxiliary network 330, configuring Sa2 a message forwarding policy comprising one or more message forwarding rules in the gateway ECU, and routing Sa3 messages onto the first, second, and third data interfaces in accordance with the message forwarding policy.

FIG. 7B illustrates a method performed by a data communication gateway 110 comprised in a construction machine communication system 100, 300, the gateway 110 comprising a first 111, a second 112, and a third 113 data interface arranged to be mutually interconnected, where the mutual interconnect is controlled by a gateway ECU. The method comprises configuring Sb1 a message format table comprising one or more message formats in the gateway ECU, wherein a message format is indicative of a message formatting relative to a standard message format of the construction machine communication system 100, 300, receiving Sb2 a message on a source interface out of the first 111, second 112, and third 113 interfaces, translating Sb3 a data content of the message based on the message format table, and forwarding Sb4 a message comprising the translated data content onto a destination interface out of the first 111, second 112, and third 113 interfaces.

FIG. 7C illustrates a method performed by a data communication gateway 110 comprised in a construction machine communication system 100, 300, the gateway 110 comprising a first 111, a second 112, and a third 113 data interface arranged to be mutually interconnected, where the mutual interconnect is controlled by a gateway ECU. The method comprises receiving Sc1, by the gateway ECU, a request for hydraulic pressure release on the second interface 112 and forwarding Sc2 the request as a hydraulic pressure release signal on the first interface 111.

FIG. 8 schematically illustrates, in terms of a number of functional units, the components of a control unit 800 according to embodiments of the discussions herein. This control unit 800 may be comprised in the vehicle 120, e.g., in the form of an ECU. Processing circuitry 810 is provided using any combination of one or more of a suitable central processing unit CPU, multiprocessor, microcontroller, digital signal processor DSP, etc., capable of executing software instructions stored in a computer program product, e.g. in the form of a storage medium 830. The processing circuitry 810 may further be provided as at least one application specific integrated circuit ASIC, or field programmable gate array FPGA.

Particularly, the processing circuitry 810 is configured to cause the control unit 800 to perform a set of operations, or steps, such as the methods discussed in connection to FIGS. 7A-C. For example, the storage medium 830 may store the set of operations, and the processing circuitry 810 may be configured to retrieve the set of operations from the storage medium 830 to cause the control unit 800 to perform the set of operations. The set of operations may be provided as a set of executable instructions. Thus, the processing circuitry 810 is thereby arranged to execute methods as herein disclosed.

The storage medium 830 may also comprise persistent storage, which, for example, can be any single one or combination of magnetic memory, optical memory, solid state memory or even remotely mounted memory.

The control unit 800 may further comprise an interface 820 for communications with at least one external device. As such the interface 820 may comprise one or more transmitters and receivers, comprising analogue and digital components and a suitable number of ports for wireline or wireless communication.

The processing circuitry 810 controls the general operation of the control unit 800, e.g., by sending data and control signals to the interface 820 and the storage medium 830, by receiving data and reports from the interface 820, and by retrieving data and instructions from the storage medium 830. Other components, as well as the related functionality, of the control node are omitted in order not to obscure the concepts presented herein.

FIG. 9 illustrates a computer readable medium 910 carrying a computer program comprising program code means 920 for performing the methods illustrated in FIGS. 7A-C, when said program product is run on a computer. The computer readable medium and the code means may together form a computer program product 900.

The invention claimed is:

1. A data communication gateway for a construction machine communication system, the construction machine using a hydraulic system to power an attachment via an intermediary attachment device, wherein to release the attachment from the intermediary attachment device, the pressure in the hydraulic feed must first be released, the data communication gateway comprising a first data interface, a second data interface, and a third data interface arranged to be mutually interconnected by a mutual interconnect, where the mutual interconnect is controlled by a gateway electronic control unit, ECU, wherein the first data interface is arranged to be connected to a private network of the construction machine, the second data interface is arranged to be connected to an attachment network, and the third data interface is arranged to be connected to an auxiliary network, wherein the gateway ECU is arranged to receive a request for hydraulic pressure release on the second data interface and to forward the request as a hydraulic pressure release signal on the first data interface, wherein, in response thereto, the construction machine controls the hydraulic feed pressure in response to the request in order to facilitate attachment assembly, wherein the gateway ECU is arranged to be connected to a hydraulic pressure sensor, wherein the gateway ECU is arranged to transmit an acknowledgement signal indicating hydraulic pressure release on the second data interface in response to detecting a pressure drop by the hydraulic pressure sensor.

2. The data communication gateway according to claim 1, wherein the gateway ECU is arranged to receive an acknowledgement signal on the first data interface in response to the hydraulic pressure release signal, and to forward the acknowledgement signal on the second data interface.

3. The data communication gateway according to claim 1, wherein the gateway ECU is arranged to receive a request for a specified hydraulic pressure on the second data interface and to forward the request as a hydraulic pressure request signal on the first data interface.

4. The data communication gateway according to claim 1, wherein the gateway ECU is arranged to receive a request for a specified hydraulic flow on the second data interface and to forward the request as a hydraulic flow request signal on the first data interface.

5. The data communication gateway according to claim 1, wherein the gateway ECU is arranged to perform an authentication procedure in response to a device connecting to one of the first data interface, the second data interface, and the third data interface.

6. The data communication gateway according to claim 5, wherein the gateway ECU is arranged to forward the hydraulic pressure release signal on the first data interface only in case the authentication procedure has been successfully completed.

7. The data communication gateway according to claim 1, wherein the gateway ECU is arranged to forward a request for adjustment of hydraulic system pressure or flow received on the second data interface on the first data interface as a command to a control unit arranged to control a hydraulic pump comprised in the construction machine.

8. The data communication gateway according to claim 7, wherein the gateway ECU is arranged to perform an authentication procedure in response to a device connecting to one of the first data interface, the second data interface, and the third data interface, wherein the gateway ECU is arranged to forward the request for adjustment of hydraulic system pressure or flow only in case the authentication procedure has been successfully completed.

9. The data communication gateway according to claim 1, wherein the gateway ECU is arranged to identify an attachment type of an attachment connected to the second data interface, wherein the gateway ECU is arranged to configure one or more hydraulic system parameters of the construction machine in dependence of the identified attachment type.

10. The data communication gateway according to claim 1, wherein at least one of the first data interface, the second data interface, and the third data interface is a controller area network, CAN, bus interface.

11. A construction machine comprising a data communication gateway, the construction machine using a hydraulic system to power an attachment via an intermediary attachment device, wherein to release the attachment from the intermediary attachment device, the pressure in the hydraulic feed must first be released, the data communication gateway comprising a first data interface, a second data interface, and a third data interface arranged to be mutually interconnected by a mutual interconnect, where the mutual interconnect is controlled by a gateway electronic control unit, ECU, wherein the first data interface is arranged to be connected to a private network of the construction machine, the second data interface is arranged to be connected to an attachment network, and the third data interface is arranged to be connected to an auxiliary network, wherein the gateway ECU is arranged to receive a request for hydraulic pressure release on the second data interface and to forward the request as a hydraulic pressure release signal on the first data interface, wherein, in response thereto, the construction machine controls the hydraulic feed pressure in response to the request in order to facilitate attachment assembly, wherein the gateway ECU is arranged to be connected to a hydraulic pressure sensor, wherein the gateway ECU is arranged to transmit an acknowledgement signal indicating hydraulic pressure release on the second data interface in response to detecting a pressure drop by the hydraulic pressure sensor.

12. The construction machine according to claim 11, wherein the gateway ECU is arranged to identify an attachment type of an attachment connected to the second data interface, wherein the gateway ECU is arranged to configure one or more hydraulic system parameters of the construction machine in dependence of the identified attachment type.

13. The construction machine according to claim 11, wherein the gateway ECU is arranged to perform an authentication procedure in response to a device connecting to one of the first data interface, the second data interface, and the third data interface, wherein the gateway ECU is arranged to forward a request for adjustment of hydraulic system pressure or flow received on the second data interface on the first data interface as a command to a control unit arranged to control a hydraulic pump comprised in the construction machine only in case the authentication procedure has been successfully completed.

14. The construction machine according to claim 11, wherein the gateway ECU is arranged to receive a request for a specified hydraulic flow on the second data interface and to forward the request as a hydraulic flow request signal on the first data interface.

15. The construction machine according to claim 11, wherein the gateway ECU is arranged to receive a request for a specified hydraulic pressure on the second data interface and to forward the request as a hydraulic pressure request signal on the first data interface.

16. The construction machine according to claim 11, wherein the gateway ECU is arranged to be connected to a hydraulic pressure sensor, wherein the gateway ECU is arranged to transmit an acknowledgement signal indicating hydraulic pressure release on the second data interface in response to detecting a pressure drop by the hydraulic pressure sensor.

17. The construction machine according to claim 11, wherein the gateway ECU is arranged to receive an acknowledgement signal on the first data interface in response to the hydraulic pressure release signal, and to forward the acknowledgement signal on the second data interface.

18. A method performed by a data communication gateway comprised in a construction machine communication system, the construction machine using a hydraulic system to power an attachment via an intermediary attachment device, wherein to release the attachment from the intermediary attachment device, the pressure in the hydraulic feed must first be released, the gateway comprising a first data interface, a second data interface, and a third data interface arranged to be mutually interconnected, wherein the gateway ECU is arranged to be connected to a hydraulic pressure sensor, where the mutual interconnect is controlled by a gateway electronic control unit, ECU, wherein the first data interface is arranged to be connected to a private network of the construction machine, the second data interface is arranged to be connected to an attachment network, and the third data interface is arranged to be connected to an auxiliary network, the method comprising receiving, by the gateway ECU, a request for hydraulic pressure release on the second data interface and forwarding the request as a hydraulic pressure release signal on the first data interface, wherein, in response thereto, the construction machine controls the hydraulic feed pressure in response to the request in order to facilitate attachment assembly, transmitting an acknowledgement signal indicating hydraulic pressure release on the second data interface in response to detecting a pressure drop by the hydraulic pressure sensor.

19. A non-transitory computer readable medium carrying a computer program comprising program code for performing a method performed by a data communication gateway comprised in a construction machine communication system, the construction machine using a hydraulic system to power an attachment via an intermediary attachment device, wherein to release the attachment from the intermediary attachment device, the pressure in the hydraulic feed must first be released, the gateway comprising a first data interface, a second data interface, and a third data interface arranged to be mutually interconnected, where the mutual interconnect is controlled by a gateway electronic control unit, ECU; the method comprising receiving, by the gateway ECU, a request for hydraulic pressure release on the second data interface and forwarding the request as a hydraulic pressure release signal on the first data interface, wherein, in response thereto, the construction machine controls the hydraulic feed pressure in response to the request in order to facilitate attachment assembly, wherein the gateway ECU is arranged to be connected to a hydraulic pressure sensor, wherein the gateway ECU is arranged to transmit an acknowledgement signal indicating hydraulic pressure release on the second data interface in response to detecting a pressure drop by the hydraulic pressure sensor.

* * * * *